US006904681B2

(12) United States Patent
Slesinski

(10) Patent No.: US 6,904,681 B2
(45) Date of Patent: Jun. 14, 2005

(54) METHOD FOR FABRICATING A DRIVING AND LOCKING MECHANISM

(75) Inventor: Steven G. Slesinski, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/631,208

(22) Filed: Jul. 31, 2003

(65) Prior Publication Data

US 2005/0022385 A1 Feb. 3, 2005

(51) Int. Cl.$^7$ .......................... B21D 53/00; F16C 23/00
(52) U.S. Cl. .................. 29/898.07; 29/505; 29/522.1; 384/620; 384/621; 411/517
(58) Field of Search ............................ 29/525.01, 505, 29/522.1, 898.07; 385/620, 621; 411/517, 411/518, 519; 403/326; 384/620, 621

(56) References Cited

U.S. PATENT DOCUMENTS

| 807,223 | A | | 12/1905 | Truesdale |
| 1,752,982 | A | * | 4/1930 | Herold ........................ 470/42 |
| 2,697,622 | A | * | 12/1954 | Leister ....................... 403/351 |
| 2,860,540 | A | * | 11/1958 | Karlsson .................... 411/518 |
| 3,062,026 | A | | 11/1962 | Pitner |
| 3,369,378 | A | * | 2/1968 | Miller, Jr. .................. 464/130 |
| 3,701,189 | A | | 10/1972 | Kadono et al. |
| 3,909,920 | A | * | 10/1975 | Cornish et al. ............. 29/522.1 |
| 4,000,628 | A | | 1/1977 | Funatani et al. |
| 4,012,821 | A | | 3/1977 | Feaster |
| 4,182,579 | A | * | 1/1980 | McCormick et al. ....... 403/326 |
| 4,511,191 | A | | 4/1985 | Kitamura |
| 4,875,787 | A | * | 10/1989 | Bauer et al. ................ 384/548 |
| 5,059,042 | A | | 10/1991 | Grierson |
| 5,417,613 | A | | 5/1995 | Aiken |
| 5,549,281 | A | * | 8/1996 | Hall ........................... 267/119 |
| 5,797,800 | A | | 8/1998 | Rhoades et al. |
| 6,162,126 | A | | 12/2000 | Barrett et al. |
| 6,280,335 | B1 | | 8/2001 | Wehner et al. |
| 6,336,868 | B1 | | 1/2002 | Kurecka et al. |
| 6,357,927 | B1 | | 3/2002 | Myers et al. |

FOREIGN PATENT DOCUMENTS

| DE | 2460448 A | 6/1978 |
| EP | 0512743 A | 11/1992 |
| JP | 2001336606 | 12/2001 |

* cited by examiner

Primary Examiner—Marc Jimenez
(74) Attorney, Agent, or Firm—Marshall & Melhorn, LLC.

(57) ABSTRACT

The present invention is a method for fabricating a driving and locking mechanism. The present invention provides a bearing device having a first end and a second end, where the first end has a curvilinear shape. The present invention also provides a strip of metal material with a predetermined length, conforming the strip of metal material to the curvilinear shape of the first end and attaching the strip of metal material to the first end.

19 Claims, 6 Drawing Sheets

METHOD FOR FABRICATING A DRIVING AND LOCKING MECHANISM

BACKGROUND OF THE INVENTION

1. Field of the Invention

This invention relates to a method for fabricating a driving and locking mechanism for a bearing device.

2. Discussion of Related Art

Differentials are provided on vehicles to divide power provided at two outputs. A wheel differential enables a pair of wheels on a common rotational axis to rotate at different speeds while the vehicle is turning. A conventional differential includes a differential carrier that receives a power transmission shaft having a pinion gear mounted at one end. The pinion gear is disposed within the differential and meshes with a ring gear that is coupled to, or integral with, a differential case. The case supports a plurality of bevel gears that transmit torque to a pair of axle half shafts that are in turn coupled to a corresponding pair having a pinion gear mounted at one end. The pinion gear is disposed within the differential and meshes with a ring gear that is coupled to, or integral with, a differential case. The case supports a plurality of bevel gears that transmit torque to a pair of axle half shafts that are in turn coupled to a corresponding pair of wheels.

The differential case is supported for rotation within the differential carrier by a pair of bearing assemblies. During assembly of the differential, each of the bearing assemblies must be properly aligned by moving the bearing assembly axially inward and outward along the axis of rotation. Conventional bearing assemblies are typically positioned and aligned within the differential carrier using threaded bearing adjusters that urge the bearing assemblies axially inward and outward. Bolts, clips, cotter pins or metal stampings are used to maintain the position of the bearing adjusters within the differential once a predetermined alignment position is reached. This configuration has a significant disadvantage. The bearing adjusters typically have a finite number of lugs (e.g., twelve to sixteen) projecting therefrom. The bolts, clips, cotter pin or stampings are inserted into one of the lugs, or in between a pair of lugs, to retain the bearing adjuster in place. As a result, the bearing adjuster, and therefore the bearing assemblies, can only assume certain angular and axial positions thereby limiting the ability to optimally align the bearing assemblies within the differential.

Some bearing assemblies may have a deformable member coupled to the bearing cup of the assembly. The deformable member allows the bearing assembly to assume an infinite number of angular and axial positions for greater control of alignment. The deformable member is stamped from a large, solid stamping resulting in significant scrap material. The resulting deformable member requires costly and time-consuming unique tooling for each diameter bearing cup.

The inventor herein has recognized a need for a method for fabricating a driving and locking mechanism for a bearing device that will minimize and/or eliminate one or more of the above-identified deficiencies. Although the above discusses the present invention in use with an axle and/or a differential, those skilled in the art will readily understand that the present invention can be used in any bearing device.

SUMMARY OF THE INVENTION

The present invention provides a method for fabricating a driving and locking mechanism for any bearing device, such as a bearing cup.

In one embodiment, a differential includes a differential carrier disposed about a first axis and a differential case disposed within the differential carrier. A bearing assembly is disposed about the first axis between the differential carrier and the differential case. The bearing assembly allows the differential case to rotate within the differential carrier. The differential carrier includes a first plurality of threads disposed on a radially inner surface. The bearing assembly includes a cup having a second plurality of threads disposed on a radially outer surface that are configured to engage the first plurality of threads.

The differential may also include a differential carrier disposed about a first axis and a differential case disposed within the differential carrier. A bearing assembly is again disposed about the first axis between the differential carrier and the differential case to allow the differential case to rotate within the differential carrier. The differential further includes a deformable member coupled to a cup of the bearing assembly. At least a portion of the deformable member is deformed and inserted into a slot in the differential carrier upon alignment of the bearing assembly within the differential carrier.

A method of assembling a differential in accordance with the present invention may include the step of providing a differential carrier and a differential case disposed within the differential carrier wherein the differential carrier and the differential case are disposed about a first axis and the differential carrier has a first plurality of threads on a radially inner surface. The method may further include the step of inserting a bearing assembly between the differential carrier and the differential case wherein the bearing assembly includes a cup having a second plurality of threads disposed on a radially outer surface and configured to engage with the first plurality of threads on the differential carrier. The method further includes the step of rotating the bearing assembly until a predetermined alignment position is reached. The inventive method may also include the steps of affixing a deformable member to the cup of the bearing assembly, deforming at least a portion of the deformable member after reaching the predetermined alignment position, and inserting at least a portion of the deformable member into a slot in the differential carrier.

The invention also includes a method for fabricating a driving and locking mechanism for a bearing device. The method includes providing a bearing device having a first end and a second end, where the first end has a curvilinear shape, providing a strip of metal with a pre-determined length, conforming the strip of metal to the curvilinear shape of the first end and attaching the strip of metal material to the second end.

The above described method may also include providing a bearing device having a first end and a second end, determining a circumference of the first end of the bearing device, providing a length of metal material, cutting a strip from the length of metal material equivalent to the circumference, bending the strip to have a shape complementary to the first end of the bearing device, and fastening the strip to the first end of the bearing device.

A differential in accordance with the present invention is advantageous. The bearing assembly between the differential carrier and differential case may be rotated to align the bearing assembly and may assume an infinite number of angular positions and axial positions providing greater control of alignment than in conventional differentials. The deformable/bendable member provides a relatively inexpensive method of securing the position of the bearing assembly upon alignment of the bearing assembly within the differential. Further, the deformable/bendable member of the present invention reduces scrap material and the need for costly and time consuming tooling.

Those skilled in the art will readily understand that the present invention can be used in any bearing device, not just for an axle and/or differential application as provided in the above summary.

These and other advantages of this invention will become apparent to one skilled in the art from the following detailed description and the accompanying drawings illustrating features of this invention by way of example.

DETAILED DESCRIPTION OF ONE OR MORE EMBODIMENTS OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
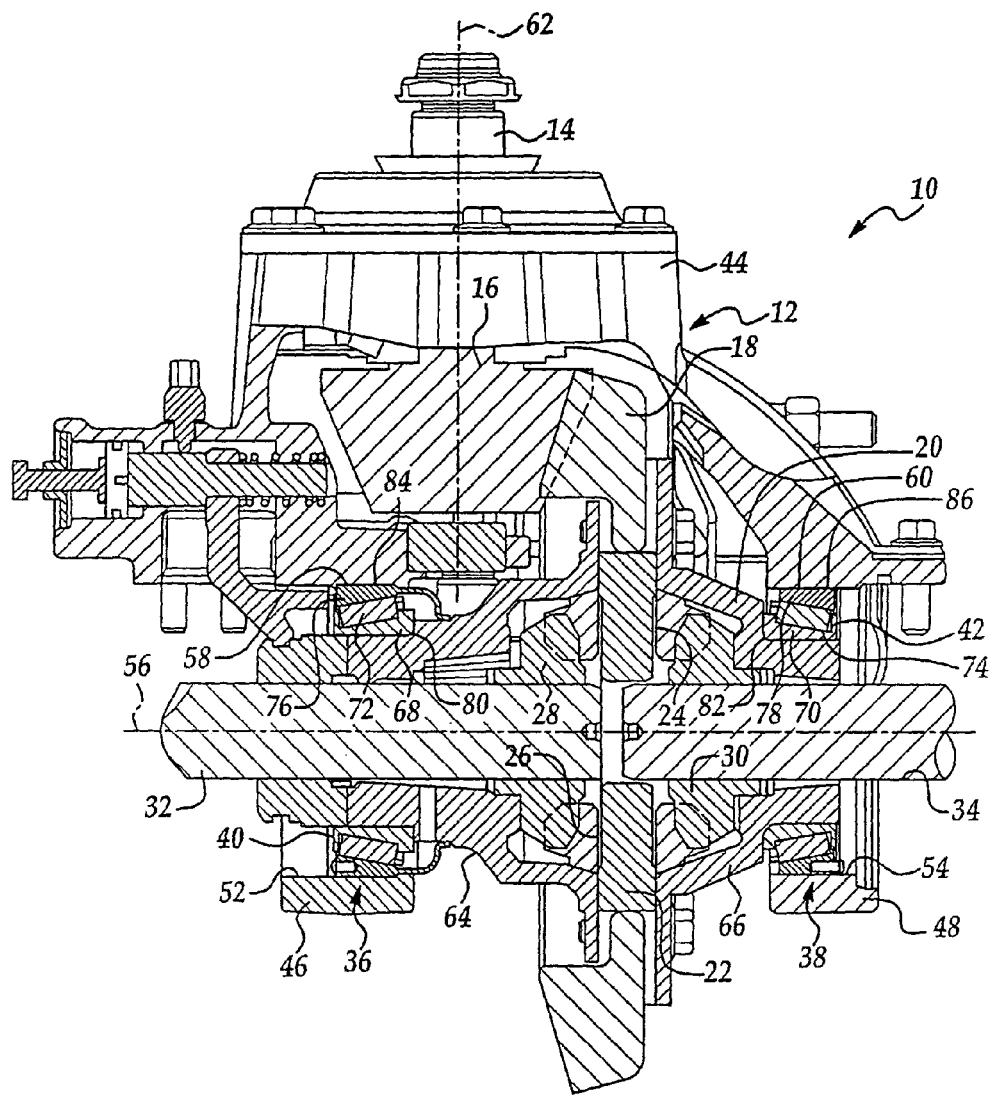
FIG. 1 is a partial cross-sectional view of a differential in accordance with the present invention.

Referring now to the drawings wherein like reference numerals are used to identify identical components in the various views, FIG. 1 illustrates a differential 10 in accordance with the present invention. Differential 10 is provided for use in vehicles to enable a pair of wheels on a common rotational axis to rotate at different speeds. Differential 10 may include a differential carrier 12 that receives a power transmission shaft 14, a pinion gear 16, a ring gear 18, a differential case 20, a differential spider 22, a plurality of bevel gears 24, 26, 28, 30, and axle half shafts 32, 34. Differential 10 may also include bearing assemblies 36, 38 in accordance with one aspect of the present invention and may further include deformable members 40, 42.

Carrier 12 houses, provides supports for, and maintains the relative position of, the other components of differential 10. Carrier 12 may be made from conventional metals and metal alloys, such as steel, and is conventional in the art. Carrier 12 may include several members coupled together using conventional fasteners (not shown). These members may include, but are not limited to, forward member 44 and bearing caps 46, 48. Members 44, 46, 48 of carrier 12 together define a pair of openings 52, 54 disposed about an axis 56 of rotation for axle half shafts 32, 34 and through which shafts 32, 34 extend. Carrier 12 also defines pluralities of threads 58, 60 on at least a portion of the radially inner surfaces of members 44, 46, 48 that define openings 52, 54.

Shaft 14 transfers torque from a drive-shaft (not shown) to pinion gear 16 and is conventional in the art. Shaft 14 is disposed about an axis 62 of rotation that extends generally perpendicular to axis 56. Shaft 14 is supported for rotation within member 44 of carrier 12 by a pair of bearing assemblies (only one of which is partially visible in FIG. 1).

Pinion gear 16 transfers torque from shaft 14 to ring gear. Pinion gear 16 may be made from conventional metals and metal alloys and may comprise a hypoid gear. Gear 16 rotates about axis 62. Gear 16 is disposed about shaft 14 and may be integral therewith as shown in the illustrated embodiment or may be mounted thereto using a conventional spline connection or in other ways customary in the art.

Ring gear 18 is provided to transfer torque from pinion gear 16 to case 20 and is conventional in the art. Ring gear 18 may also be made from conventional metals and metal alloys and may also comprise a hypoid gear. Gear 18 is affixed to case 20 or may be integral therewith and is disposed about axis 56.

Case 20 is provided to house spider 22 and bevel gears 24, 26, 28, 30 and to transfer torque to bevel gears 24, 26, 28, 30. Case 20 is conventional in the art and may be made from conventional metals and metal alloys. Case 20 includes first and second members 64, 66 that are coupled together using fasteners such as bolts or in other ways customary in the art. Case 20 is disposed within carrier 12 and, in particular, within openings 52, 54 of carrier 12. Case 20 is also disposed about axis 56 and is supported for rotation about axis 56 relative to carrier 12 by bearing assemblies 36, 38.

Spider 22 provides a mounting arrangement for bevel gears 24, 26 and is conventional in the art. Spider 22 is coupled to case 20 for rotation therewith and supports at least two bevel gears 24, 26 that rotate with spider 22.

Bevel gears 24, 26, 28, 30 are provided to divide and transfer torque between axle half shafts 32, 34. Gears 24, 26, 28, 30 are conventional in the art and may be made from conventional metals and metal alloys. Gears 24, 26 are mounted on spider 22 for rotation with spider 22. Gears 28, 30 are mounted on axle half shafts 32, 34 for rotation with shafts 32, 34 and rotate in response to rotation of gears 24, 26.

Axle half shafts 32, 34 transfer torque to wheels (not shown) disposed on either side of differential 10. Shafts 32, 34 are conventional in the art and extend outwardly from differential case 20 and carrier 12 through openings 52, 54. Bearing assemblies 36, 38 enable rotation of differential case 20 within carrier 12. Assemblies 36, 38 are disposed within openings 52, 54 of carrier 12 between case 20 and carrier 12 and are disposed about axis 56. Each of assemblies 36, 38 may include a cone 68, 70, bearing members 72, 74, and a bearing cup 76, 78, respectively.

Cones 68, 70 define a radially inner bearing race and are conventional in the art. Cones 68, 70 are supported on a radially outer surface of case 20 and abut shoulders 80, 82, respectively, formed in case 20.

Bearing members 72, 74 are disposed between cones 68, 70 and cups 76, 78, respectively. Members 72, 74 are also conventional in the art and may comprise tapered roller bearings.

Cups 76, 78 define a radially outer bearing race and are disposed about axis, 56, cones 68, 70 and bearing members 72, 74. In accordance with the present invention, cup 76, 78 each define a plurality of threads 84, 86, respectively, on a radially outer surface. Threads 84, 86 are configured to engage corresponding threads 58, 60, on a radially inner surface of carrier 12 to allow movement of bearing assemblies 36, 38 within openings 52, 54 inward and outward along axis 56.

Figure 2:
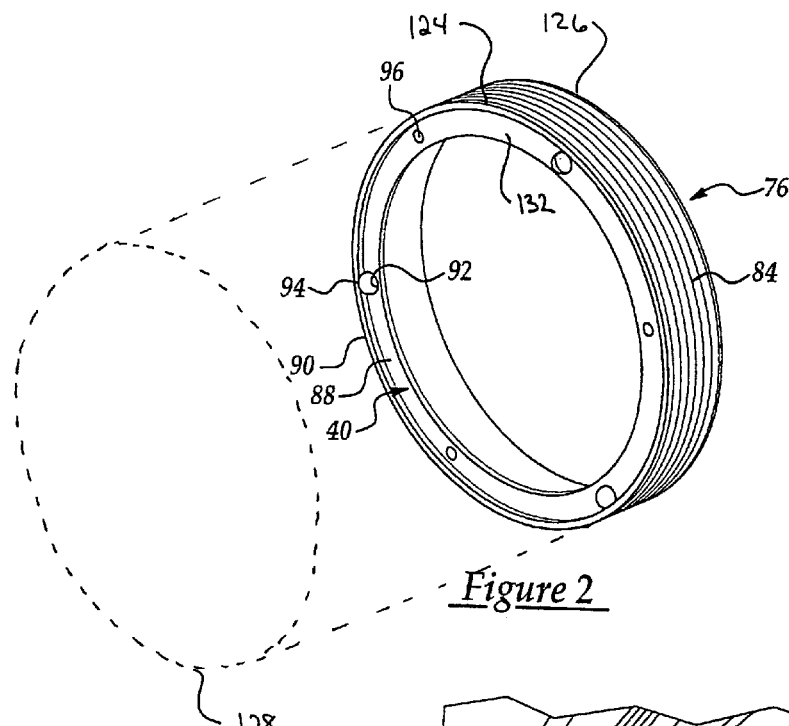
FIG. 2 is perspective view of a bearing device and deformable member of the differential of FIG. 1.
Figure 3:
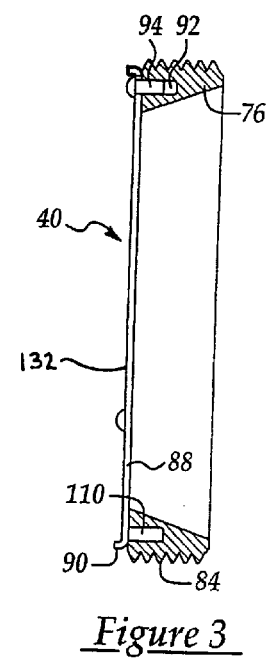
FIG. 3 is a cross-sectional view a bearing device and deformable member of the differential of FIG. 1.

Referring now to FIGS. 1–2, deformable members 40, 42 secure the position of bearing assemblies 36, 38 once assemblies 36, 38 have attained a predetermined alignment position within differential 10. Although a single deformable member 40 is illustrated in FIGS. 2–3, it should be understood that members 40, 42 may be identical in construction and that the additional description of member 40 set forth herein may be equally applicable to member 42.

Each member 40, 42 is constructed from conventional malleable metals or malleable metal alloys. Each member 40, 42 conforms to the shape, size and curvature of the corresponding cup 76, 78. Each member 40, 42 and is disposed about axis 56 upon installation within differential 10 (as shown in FIG. 1). Each member 40, 42 is generally L-shaped in cross-section and has two legs 88, 90.

Leg 88 extends radially relative to axis 56. In one embodiment, leg 88 defines a plurality of apertures 92 through which fasteners 94 may be used to couple leg 88, and therefore member 40, to a corresponding cup 76 of a corresponding bearing assembly 36. Apertures 92 may be equally angularly spaced about leg 88. In the illustrated embodiment, leg 88 includes three apertures 92. It should be understood, however, that the number of apertures 92 and fasteners 94 used to couple leg 88 to bearing cup 76 may vary. Fasteners 94 comprise pins in one constructed embodiment. It should be understood, however, that other fasteners such as dowels, screws, rivets, or bolts may alternatively be used. Member 40 and bearing assembly 36 may be rotated within openings 52, 54 of carrier 12 using a tool that grasps one or more fasteners 94.

Figure 4:
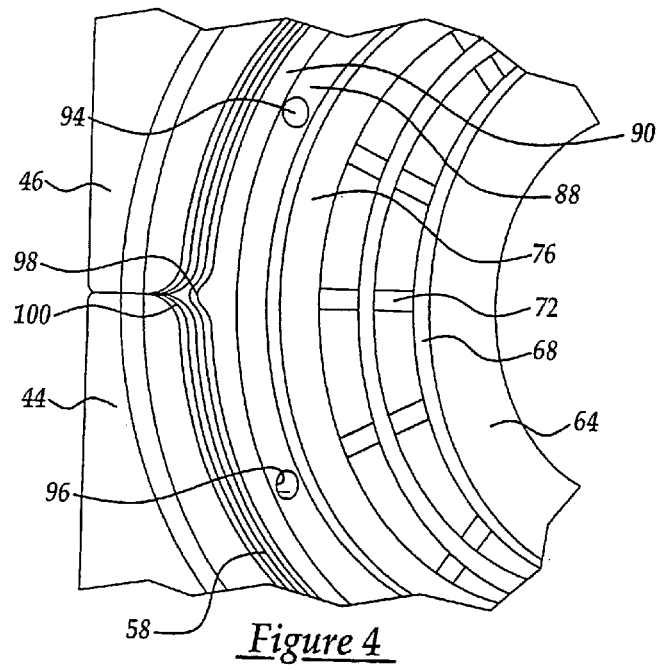
FIG. 4 is a perspective view illustrating engagement of a carrier and deformable member of the differential of FIG. 1.

Alternatively, leg 88 may define additional apertures 96 configured to receive a spanning tool used to rotate member 40 and bearing assembly 36. Apertures 96 may be equally angularly spaced about leg 88 and each of apertures 96 may be located midway between a pair of apertures 92, angularly equidistant from each aperture 92 of the pair. Leg 90 extends axially and is perpendicular to leg 88, extending away from cup 76. Upon alignment of bearing assembly 36 within differential 10, leg 90 may be deformed by applying a radial force in a radially outward direction on the radially inner side of leg 90 at one or more locations. Referring to FIG. 4, in this manner one or more portions 98 of leg 90 are urged radially outwardly and are inserted into slots 100 formed in carrier 12 thereby securing bearing assemblies against further movement.

In another embodiment, leg 88 is welded to the bearing cup by means known to those skilled in the art.

Figures 5, 6:
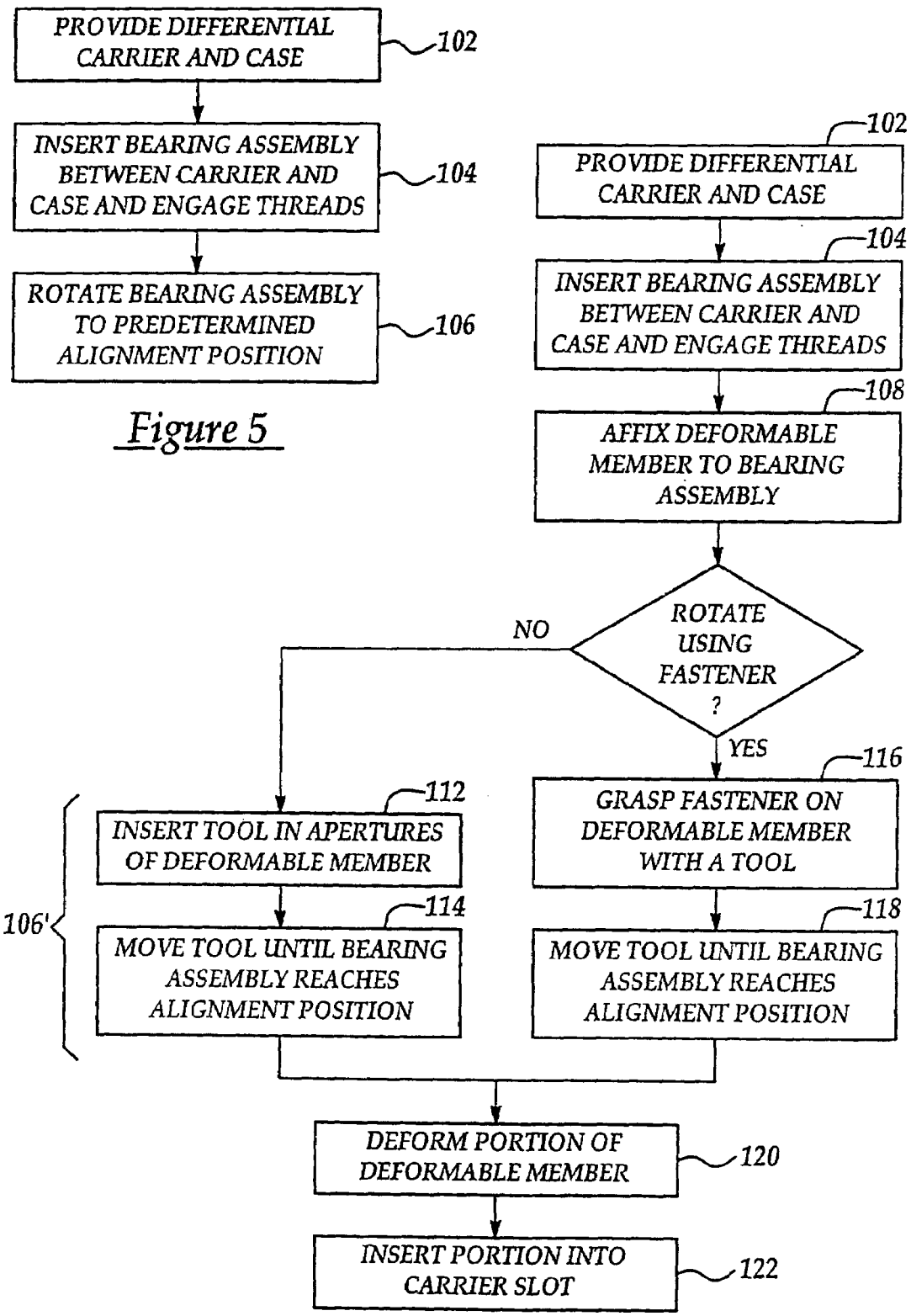
FIG. 5 is a block diagram illustrating a method for assembling a differential in accordance with one embodiment of the present invention.
FIG. 6 is a block diagram illustrating a method for assembling a differential in accordance with another embodiment of the present invention.

Referring now to FIGS. 5 and 6, methods of assembling a differential in accordance with the present invention will be described. Each method may include the step 102 of providing a differential carrier 12 and a differential case 20 disposed within the differential carrier 12 wherein the differential carrier 12 and the differential case 20 are disposed about a first axis 56 and the differential carrier 12 has a plurality of threads 60 on a radially inner surface. Each method may further include the step 104 of inserting a bearing assembly 36 between the differential carrier 12 and the differential case 20 wherein the bearing assembly 36 includes a cup 76 having a plurality of threads 84 disposed on a radially outer surface and configured to engage the threads 60 on carrier 12. In accordance with one embodiment of the present invention illustrated in FIG. 5, the method may conclude with the step 106 of rotating the bearing assembly 36 until a predetermined alignment position is reached.

In accordance with another embodiment of the present invention illustrated in FIG. 6, the method may further include the step 108 of affixing a deformable member 40 to the cup 76 of the bearing assembly 36. Referring to FIGS. 1–3, member 40 may be affixed to cup 76 using one or more fasteners 94 extending through corresponding apertures 92, 110 in member 40 and cup 76, respectively. The use of member 40 allows bearing assembly 36 to be rotated in several ways. As described hereinabove, member 40 may include one or more apertures 96 configured to receive a tool.

Accordingly, the step 106' of rotating assembly may include the substeps 112, 114 of inserting a tool through one or more of apertures 96 in member 40 and moving the tool until bearing assembly 36 reaches a predetermined alignment position. Alternatively, step 106' may include the substeps 116, 118 of grasping a fastener 94 coupling member 40 to cup 76 of bearing assembly 36 with a tool and moving the tool until bearing assembly 36 reaches a predetermined alignment position. Referring again to FIG. 6, the method may further include the steps 120, 122 of deforming at least a portion 98 of deformable member 40 after bearing assembly 36 has reached a predetermined alignment position and inserting the portion or portions 98 into a slot or slots 100 in differential carrier 12. Referring to FIG. 5, one or more portions 98 of leg 90 of member 40 may be deformed and inserted into slots 100 by exerting a radially outward force on leg 90 (e.g., by using a punching tool).

A differential and method for assembling a differential in accordance with the present invention offer significant advantages. In particular, the bearing assemblies 36, 38 may be securely positioned in infinitely variable angular and axial positions. As a result, the bearing assemblies 36, 38 may be optimally aligned within differential 10. The invention also reduces the cost and weight of differential 10 by eliminating the need for separate bearing adjusters.

A method of fabricating a driving and locking mechanism for a bearing device in accordance with the present invention will now be described. The bearing device can include bearing cups and/or bearing cups with bearing adjustors located thereon. By way of example only, a bearing cup has been used hereinabove and will be used below to describe an embodiment of the invention, however, the present invention is not limited to bearing cups.

Referring to FIG. 2, the bearing cup 76 has a first end 124 and a second end 126 where at least the first end 124 has a curvilinear shape. Preferably, the circumference 128 of the first end 124 is determined either manually or by automatic means known to those skilled in the art.

Figure 7:
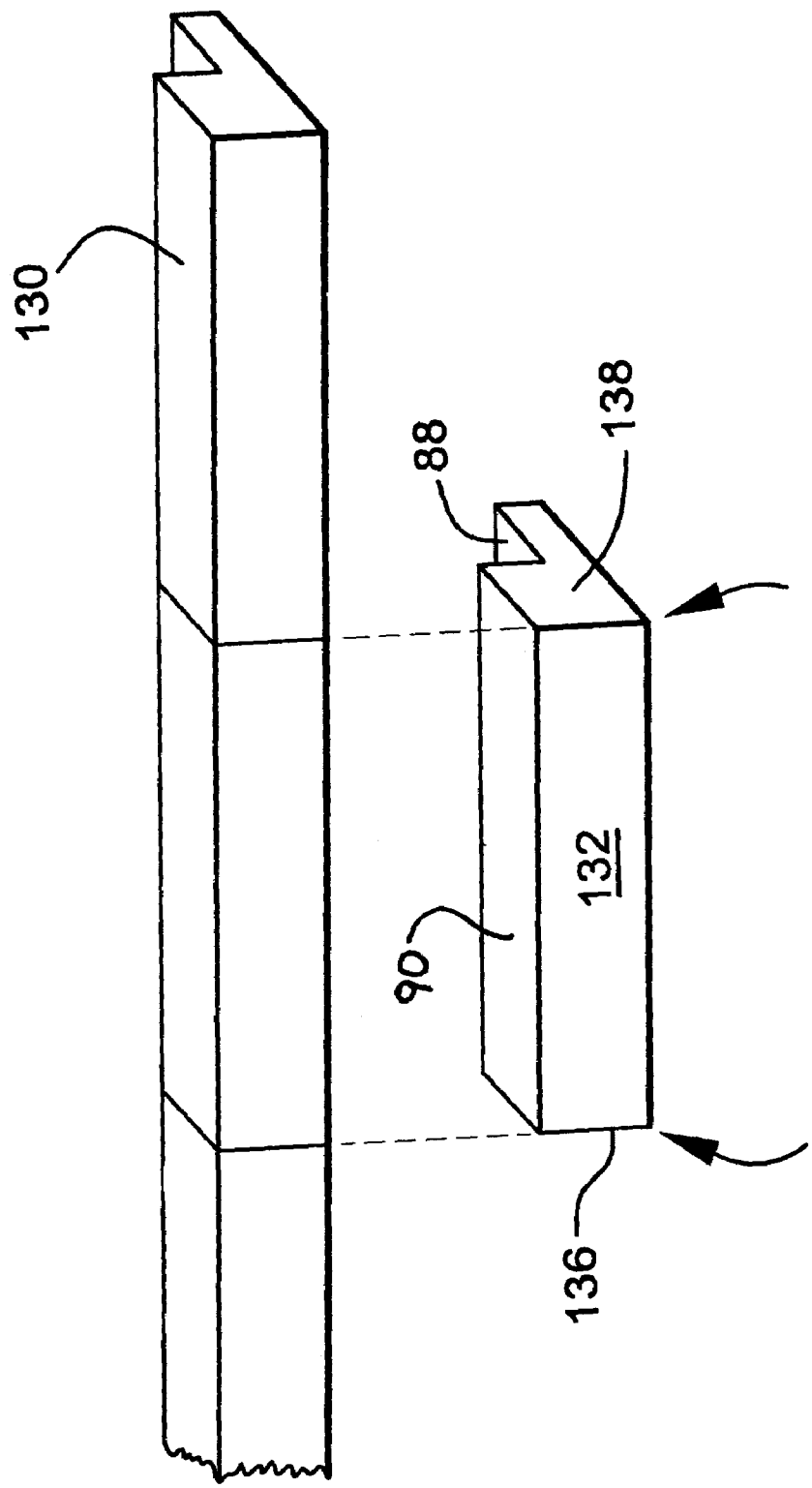
FIG. 7 is a perspective, schematic view of an embodiment of the present invention.

As seen in FIG. 7, a pre-determined length 130 of metal material is provided where the metal material is a malleable metal or malleable metal alloy. A strip 132 of material is cut from the length 134 of metal material using any means known to those skilled in the art including, but not limited to, lasers, fluid cutting devices, and/or manually or automatically operated saws. A strip 132 of material is cut which corresponds to the circumference 128 of the first end 124 of the bearing cup 76. The strip 132 of material has a first end 136 and a second end 138.

A first leg 88 and a second leg 90 may be formed in the pre-determined length 134 of metal material or the first 88 and second legs 90 may be formed in the strip 132 of material after it is cut from the length 134 of material. The first 88 and second legs 90 may be formed manually or by automatic means known to those skilled in the art. Preferably, the legs 88, 90 are substantially perpendicular to each other.

The cut strip 132 of material is bent to have a complementary shape to the first end 124 of the bearing cup 76. The bending may be accomplished by manual or automatic means as commonly known to those skilled in the art.

Figure 8:
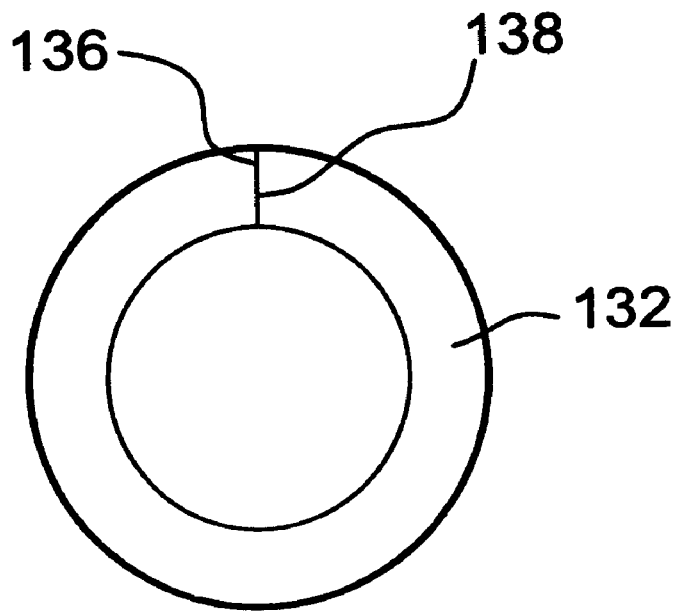
FIG. 8 is a perspective, schematic view of an embodiment of the component of FIG. 7.
Figure 9:
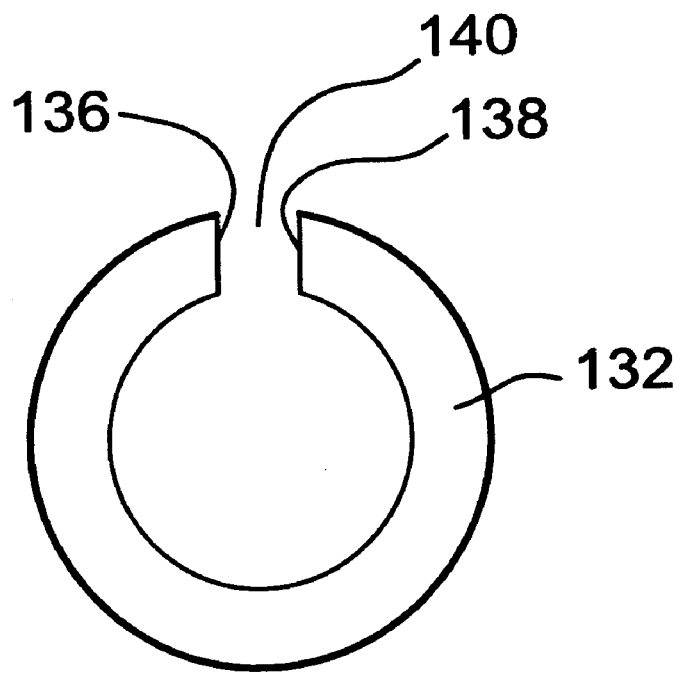
FIG. 9 is a perspective, schematic view of another embodiment of the component of FIG. 7.

As seen in FIGS. 8 and 9, the cut strip 132 of material is bent to locate the first end 136 adjacent the second end 138. In one embodiment, the strip 132 of material is bent so that the first end 136 contacts the second end 138, as depicted in FIG. 8. In this embodiment, the first end 136 may be joined with the second end 138 by any means known to those skilled in the art including, but not limited to, welding. Alternatively, the first end 136 may contact the second end 138 without the joining step.

In another embodiment, the strip 132 of material is bent so that a gap 140 is left between the first end 136 and the second end 138 as seen in FIG. 9.

Figure 3A:
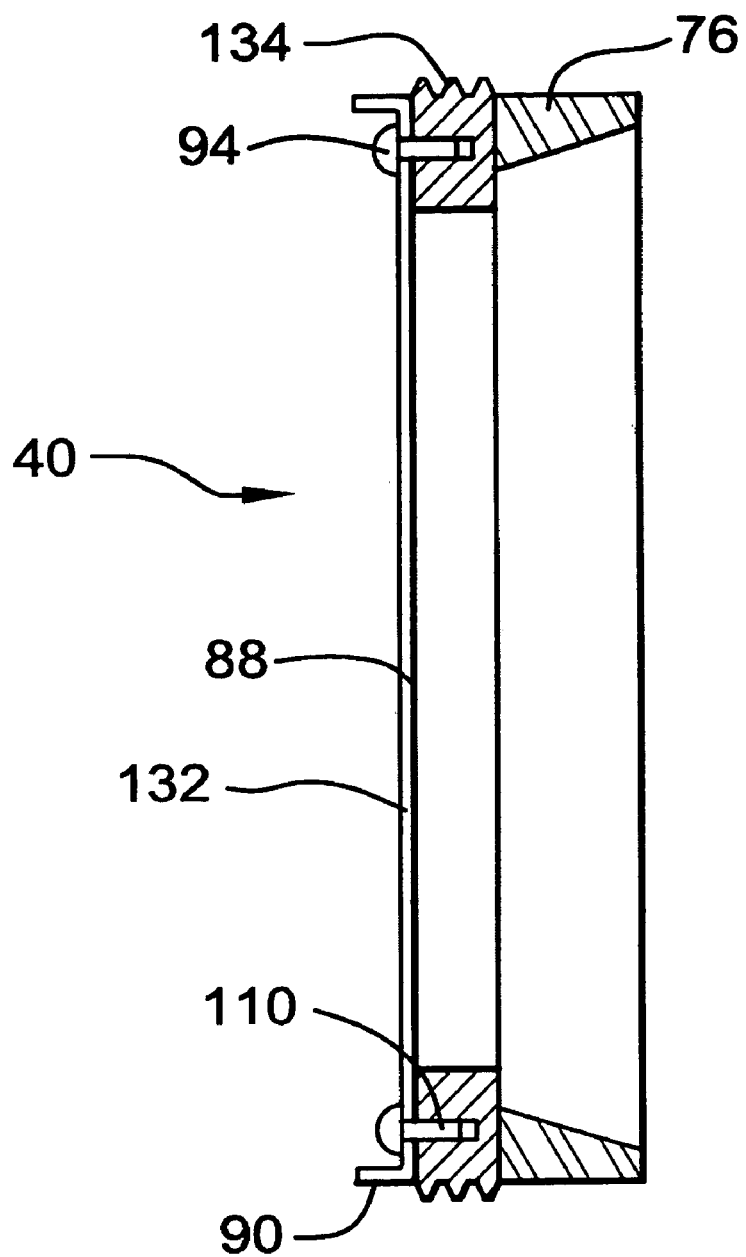
FIG. 3a is a cross-sectional view of an alternative embodiment of the present invention.

Regardless of which embodiment is used, the bent strip 132 of material is attached to the first end 124 of the bearing cup 76 as described above and depicted, for example, in FIG. 3. FIG. 3a depicts an alternative embodiment wherein the bent strip 132 of material is attached to a bearing adjuster 134.

The bearing cup 76 and attached strip 132 of material are located in the carrier 12 also as described above. Leg 90 may be deformed as described above and depicted in FIG. 4, thereby locking the bearing assembly 36 against further movement.

In accordance with the provisions of the patent statutes, the present invention has been described in what is considered to represent its preferred embodiments. However, it should be noted that the invention can be practiced otherwise than as specifically illustrated and described without departing from its spirit or scope.

I claim:

1. A method for fabricating a driving and locking mechanism for a bearing device, comprising:
   providing a bearing device having a first end and a second end, said first end having a curvilinear shape;
   providing a strip of metal material with a pre-determined length, said strip having a cross-sectional shape with a first leg and a second leg perpendicular to said first leg;
   conforming said strip of metal material to said curvilinear shape of said first end; and
   locating a plurality of fasteners through said first leg and into said bearing device and deforming selected portions of said second leg into slots spaced about said bearing device to secure said strip to said bearing device.

2. A method for fabricating a driving and locking mechanism for a bearing device, comprising:
   providing a bearing device having a first end and a second end;
   determining a circumference of said first end of said bearing device;
   providing a length of metal material having a cross-sectional shape with a first leg and a second leg perpendicular to said first leg;
   cutting a strip from said length of metal material equivalent to said circumference;
   bending said strip to have a shape complementary to said first end of said bearing device; and
   locating a plurality of fasteners through said first leg and into said bearing device and deforming selected portions of said second leg into slots spaced about said bearing device to secure said strip to said bearing device.

3. The method of claim 2, wherein said first leg extends radially with respect to said bearing device once said strip is fastened to said first end of said bearing device.

4. The method of claim 2, wherein said second leg extends axially with respect to said bearing device once said strip is fastened to said first end of said bearing device.

5. The method of claim 2, wherein said bearing device has a first set of threads disposed on a radially outer surface designed to engage with a second set of complementary threads on a carrier.

6. The method of claim 5, wherein said bearing device is rotated in said carrier until a predetermined alignment is reached.

7. The method of claim 6, wherein said second leg is radially deformed outwardly into said slots formed in said carrier.

8. The method of claim 2, wherein at least one aperture is located in said first leg of said strip.

9. The method of claim 8, wherein said fasteners are used to secure said strip to said first end of said bearing device.

10. The method of claim 9, wherein each of said fasteners are located in at least one aperture in said strip and secured to said first end of said bearing device.

11. The method of claim 2, wherein said strip has a first end and a second end.

12. The method of claim 11, wherein said strip is bent to locate said first end adjacent said second end.

13. The method of claim 12, wherein said first end contacts said second end.

14. The method of claim 12, wherein said first end is joined with said second end.

15. The method of claim 14, wherein said first end is joined with said second end by welding.

16. The method of claim 12, wherein a gap remains between said first end and said second end.

17. The method of claim 2, wherein said strip of metal material is bent manually.

18. The method of claim 2, wherein an automated process is used to bend said strip of metal material.

19. A driving and locking mechanism for a threaded bearing device produced by the process, comprising:
   providing a bearing device having a first end and a second end, said first end having a curvilinear shape;
   providing a strip of metal material with a pre-determined length, said strip having a cross-sectional shape with a first leg and a second leg perpendicular to said first leg;
   conforming said strip of metal material to said curvilinear shape of said first end; and
   locating a plurality of fasteners through said first leg and into said bearing device and deforming selected portions of said second leg into slots spaced about said bearing device to secure said strip to said bearing device.

* * * * *